UNITED STATES PATENT OFFICE.

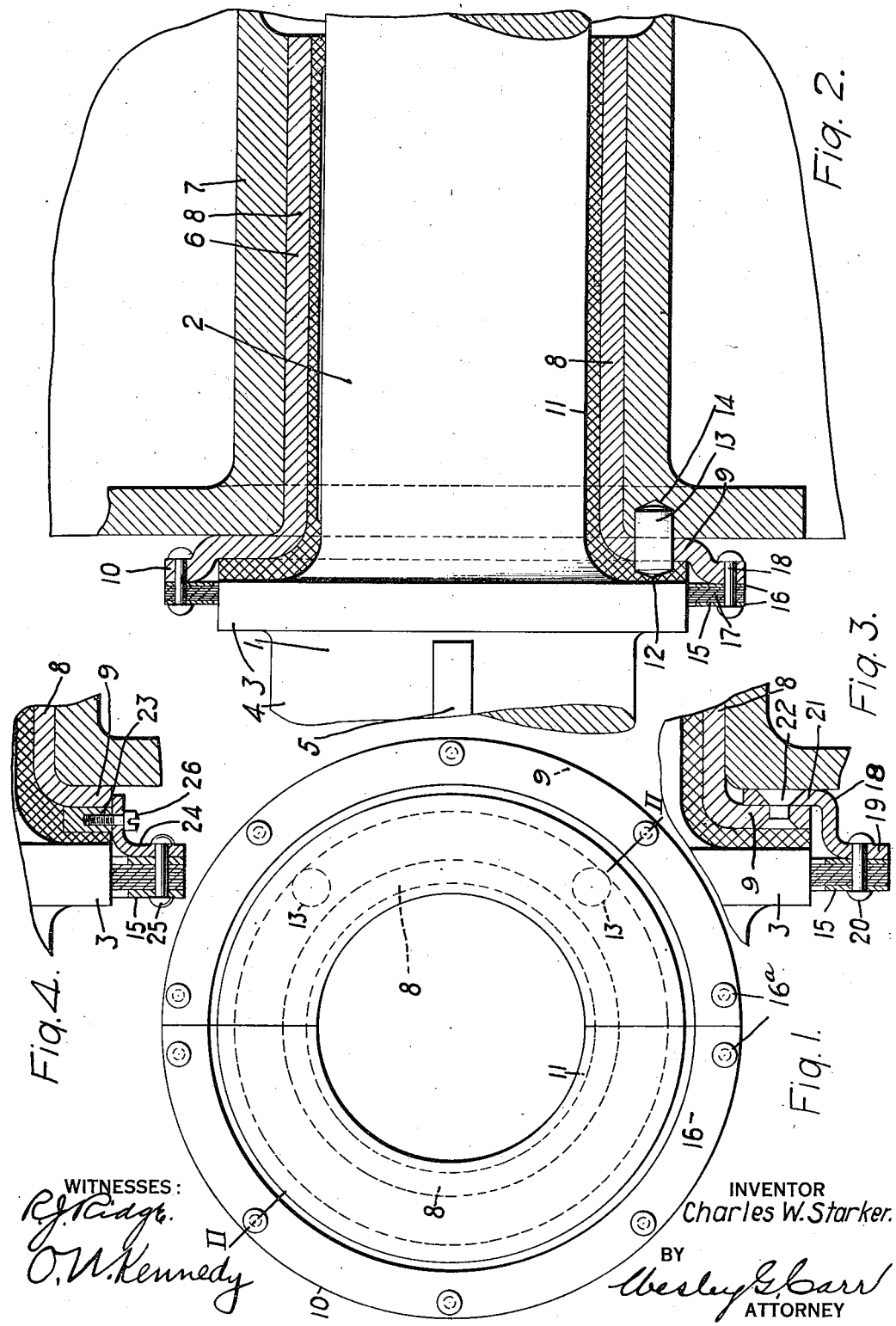

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

AXLE-BEARING.

1,300,507.  Specification of Letters Patent.  Patented Apr. 15, 1919.

Application filed September 10, 1915. Serial No. 50,084.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Axle-Bearings, of which the following is a specification.

My invention relates to axle bearings for electric railway motors, and it has for its object to provide an axle bearing that is particularly simple and inexpensive in construction.

Another object of my invention is to provide means for preventing the entrance of dust and dirt into the axle bearing, by the use of a guard member that may be readily applied to the bearing.

Axle bearings of usual construction for electric railway motors comprise cylindrical bearing members composed of some suitable bearing material or babbitt-lined metal shells. Such bearing members are usually positioned in suitable housings, and the bearing surfaces are protected from the entrance of dust and dirt by the use of guard members encircling the axles and suitably secured to the bearing housings.

By my invention, I provide an axle bearing in which the bearing shell is formed from pressed metal and is provided with an integral flange to which the dust guard may be secured, so that the two members form a substantially unitary structure.

In the accompanying drawings, Figure 1 is a view, in end elevation, of an axle bearing and guard member constructed in accordance with my invention. Fig. 2 is a sectional view along the line II—II of Fig. 1, and Figs. 3 and 4 are fragmentary sectional views showing modifications of the parts shown in Fig. 2.

An axle 1 of an electric railway motor (not shown) is provided with a journal portion 2, a portion 3 of somewhat greater diameter than the journal 2, and a wheel seat 4 provided with a keyway 5 by means of which a suitable vehicle wheel may be mounted thereon. The journal portion 2 of the axle 1 is rotatably mounted in a bearing 6 that is located within the bore of a bearing housing 7. The bearing 6 comprises two similar semi-cylindrical shell portions 8, preferably composed of pressed steel, that are severally formed with concentric and offset semi-annular flanges 9 and 10. A layer 11 of Babbitt metal is cast into each shell portion 8 and extends around the outer face of the inner flange 9. One of the shell portions 8 is further provided with a plurality of drilled openings 12 extending through the flange 9, and the completed bearing half is secured to the housing 7 by means of dowel pins 13 coacting with the openings 12 and openings 14 that are provided in the outer wall of the housing 7. The outside diameter of the portion 3 of the axle 1 is substantially equal to the outside diameter of the layer 11 of Babbitt metal that is formed upon the flanges 9 of the shell portions 8. Guard members 15 severally comprise a pair of semi-annular plates 16 between which are included layers 17 of felt or some other similar material. The inner diameter of the plates 16 is slightly greater than the diameter of the portion 3 of the axle 1. Each guard member 15 is held together and maintained concentrically with respect to the axle 1 by means of rivets 16ª extending through the plates 16 and layers 17 and the outer flange 10 of the bearing shell portion 8. The layers 17 of felt fit closely around the portion 3 of the axle 1 and prevent the entrance of any dust or dirt into the adjacent bearing surfaces.

A modification of my invention is shown in Fig. 3, wherein each bearing-shell portion 8 is formed with but one flange 9. The guard members 15 are maintained concentrically with respect to the axle 1 by means of semi-annular supporting members 18 that are of substantially Z-shape in cross section. Each guard member 15 is secured to the outer flange 19 of the support 18 by means of rivets 20, and the inner flange 21 is secured to the flange 9 of the shell portion 8 by means of rivets 22.

A further modification of my invention is shown in Fig. 4 wherein a semi-annular strip 23 is welded to the flange 9 of each shell portion 8. The guard members 15 are maintained concentrically with respect to the axle 1 by means of semi-annular supporting members 24 that are of substantially L-shape in cross section. Each guard member 15 is secured to a transverse portion of the support 24 by means of rivets 25, and the longitudinal portion of the support 24 is secured to the strip 23 by means of set screws 26.

From the foregoing, it is apparent that an axle bearing and a dust guard constructed in accordance with my invention constitute a substantially unitary structure, the use of which is adapted to effect a saving of both labor and material in the construction of electric railway motors.

While I have shown my invention in its simplest and preferred forms, it is not so limited but is susceptible of various other modifications within the scope of the appended claims.

I claim as my invention:

1. In an axle bearing, the combination with a housing member having a cylindrical seat, a bearing member positioned therein and comprising a shell having an external flanged portion, a layer of bearing metal within said shell and an axle rotatably mounted in the said bearing and having an enlarged portion adjacent to the said flanged portion, of a guard member encircling the enlarged portion of the said axle and secured to the flanged portion of the said shell.

2. In an axle bearing, the combination with a housing member having a cylindrical seat, a bearing member positioned therein and provided with a plurality of external concentric flanges, one of which abuts the said housing member, a layer of bearing metal positioned within said bearing member, and an axle rotatably mounted in the said bearing, of a guard member encircling the said axle and secured to the outer flange of the said bearing member.

3. In an axle bearing, the combination with a housing member having a cylindrical seat, a bearing member positioned therein and provided with a plurality of external and concentric flanges, and an axle rotatably mounted in the said bearing and having an enlarged portion adjacent to the inner flange, of a guard member encircling the enlarged portion of the said axle and secured to the outer of the said flanges, and a layer of bearing metal positioned within said bearing member, a portion of which is disposed between said bearing member and the enlarged portion of the shaft.

4. In an axle bearing, the combination with a housing member having a cylindrical seat, a bearing member positioned therein and comprising a pressed metal shell provided with an inner layer of bearing metal, and an axle rotatably mounted in the said bearing, of a guard member encircling the said axle and secured to the said shell.

5. In an axle bearing, the combination with a housing member having a cylindrical seat, a bearing member positioned therein and comprising a pressed metal shell provided with an inner layer of bearing metal and an external flange, and an axle rotatably mounted in the said bearing, of a guard member encircling the said axle and secured to the flange of the said shell.

6. In a bearing, the combination with a cylindrical shell provided with an inner layer of bearing metal, of a guard member secured to said shell and concentric therewith.

7. In a bearing, the combination with a cylindrical shell having an external flange and provided with an inner layer of bearing metal, of a guard member secured to the said flange and concentric therewith.

8. In a bearing, the combination with a portion of non-bearing metal provided with a layer of bearing metal, of a guard member secured to said non-bearing metal portion.

9. In a bearing, the combination with a portion of non-bearing metal provided with a layer of bearing metal, and an axle rotatably mounted in said bearing, of a guard member encircling said axle and secured to said non-bearing metal portion.

10. In an axle bearing, the combination with a housing member having a cylindrical seat, a bearing member positioned therein and provided with a plurality of external and concentric flanges, a layer of bearing metal positioned within said bearing member and provided with a flange, an axle rotatably mounted in the bearing and having an enlarged portion adjacent to the inner of the said bearing member flanges, of a guard member secured to the outer bearing-member flange, the bearing-metal flange being interposed and having the flange of layer of bearing metal interposed between the said bearing member and the said enlarged portion of the shaft.

11. In an axle bearing, a housing member having a cylindrical seat, a bearing member positioned therein and provided with two external flanges, a layer of bearing metal positioned within said bearing member and provided with a flange, an axle rotatably mounted in the bearing and having an enlarged portion engaging one side of the bearing-metal flange, and a guard member encircling the enlarged portion of the said axle and mounted on the outer bearing-member flange, the inner of said flanges being located between the bearing housing and the bearing-metal flange.

In testimony whereof, I have hereunto subscribed my name this 31st day of Aug. 1915.

CHARLES W. STARKER.

It is hereby certified that in Letters Patent No. 1,300,507, granted April 15, 1919, upon the application of Charles W. Starker, of Pittsburgh, Pennsylvania, for an improvement in "Axle-Bearings," errors appear in the printed specification requiring correction as follows: Page 2, line 98, claim 10, after the word "member" insert the words *encircling the enlarged portion of said axle and;* same page and claim, lines 100–101, strike out the words "and having the flange of layer of bearing metal interposed"; and that the said Letters Patent should be read with these corrections therein that the same may conform to the record of the case in the Patent Office.

Signed and sealed this 8th day of July, A. D., 1919.

[SEAL.]

R. F. WHITEHEAD,
*Acting Commissioner of Patents.*

Cl. 64—22.